Patented Aug. 3, 1943

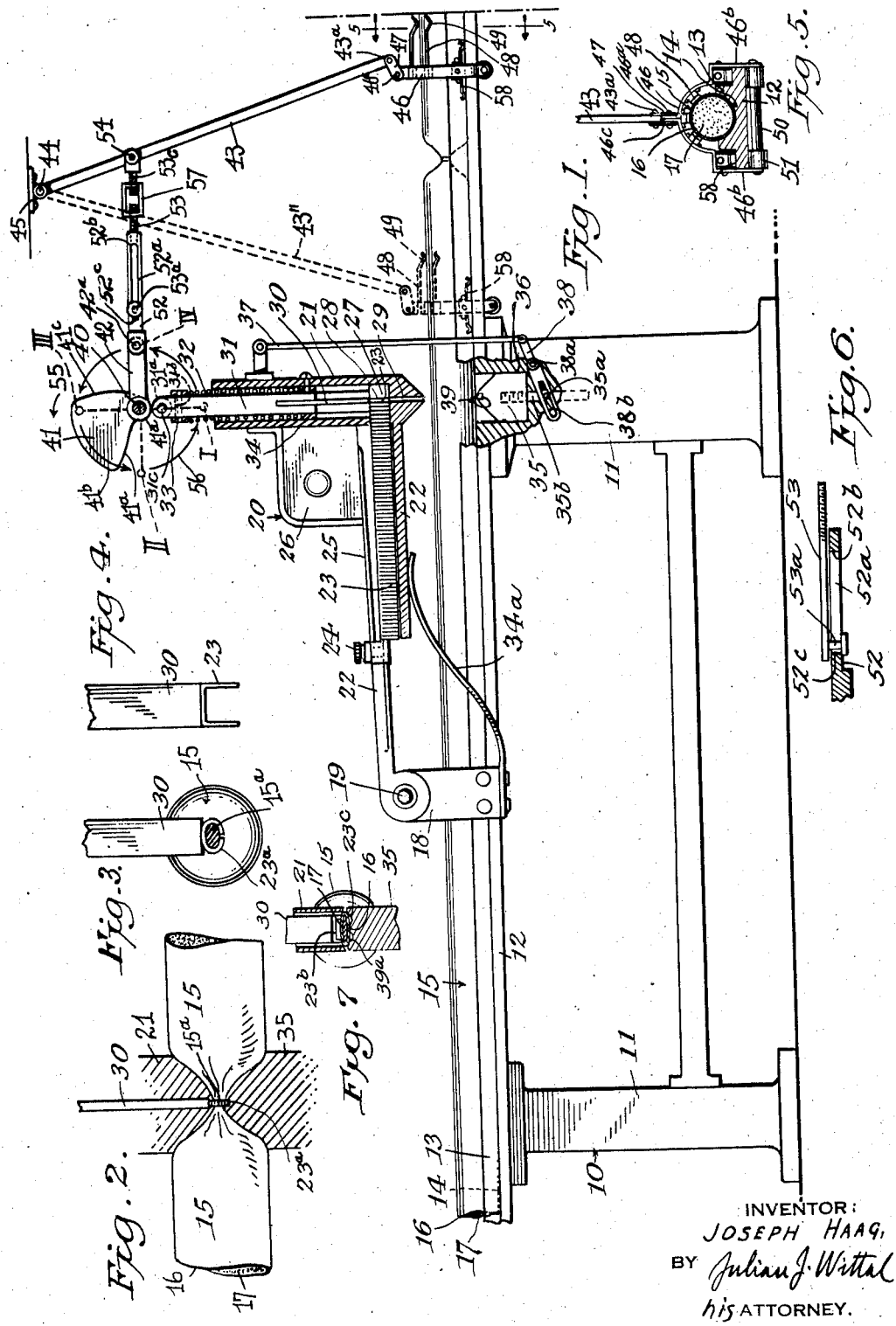

2,325,769

UNITED STATES PATENT OFFICE 2,325,769

MACHINE FOR MANUFACTURING LINKED SAUSAGES

Joseph Haag, New York, N. Y., assignor of sixty-six and two-thirds per cent to Julian J. Wittal, New York, N. Y.

Application November 3, 1937, Serial No. 172,520

8 Claims. (Cl. 17—34)

This invention relates to machines for manufacturing sausages, where a comparatively long original sausage is subdivided into smaller units, like the well-known frankfurters, and my invention has for its main object to provide novel means for said subdivision, usually called the "linking" operation, so that said "linking" may be done automatically, by appropriate machinery, in a quicker, more efficient and more practical manner than it is done at present by manual labor.

My invention particularly relates to the manufacturing of the so-called skinless frankfurters which originally have a casing of artificial material to be removed during the manufacturing process, as will be described hereinafter, but, of course, my apparatus may be used for sausages with natural casings.

Frankfurters, and similar sausages, are manufactured today by first filling a long tube-like casing with comminuted meat, spices and other ingredients of the sausage, then subdividing or "linking" the same by twisting or twirling the casing of the soft long sausage at pre-determined points by manual operation, thereby producing smaller, usually substantially identical, separate units, closed by the twisted portions of the casing.

The linked chain of sausages is now exposed to the usual further operations, like steaming and smoking, and when it is matured, the individual sausages are separated by cutting through the twisted portions.

The described manual twisting or linking of the sausages is a slow and awkward operation, requiring considerable skill, and, in many cases, the produced individual sausages or frankfurters are of different lengths, said differences being observable by the eye and preventing a ready sale of the smaller ones. The twisted or twirled portions of the casings may also open up, causing considerable loss in the manufacturing. Other drawbacks and shortcomings which accompany such manual linking are known to those versed in this art.

It is also known that artificial casings, being thin, transparent, flexible sheet tubings, usually made of cellulose products, like "Cellophane," "Visking," etc. are increasingly used in the manufacture of frankfurters, and such artificial casings are still less adapted for manual linking than the natural ones.

The use of such artificial casings is practically imperative in the manufacturing of the so-called "skinless" frankfurters, wherein, after the linking and maturing operations, the casing or skin is removed from the individual frankfurter by pulling it off, starting from the severed ends thereof, and the natural casing is not well adapted for such removal of the skin.

My novel machine is particularly adapted for such artificial casings and provides a safe, efficient and expeditious means for "linking" such sausages, permitting an easy removal of their skins.

With these and other objects in view, my novel machine consists in providing means for automatically, intermittently and repeatedly moving the filled original long sausages in front of or over a stapling head, and contracting, closing and securing said long casing at pre-determined places by staples of wire, metal strips, or the like, through the use of said stapling head, such stapling materials and machines being well-known in the art of stapling, and one embodiment of their application to the present invention being shown in the accompanying drawing.

In the drawing:

Fig. 1 is a diagrammatical elevation of a machine used for such stapling operation on frankfurters at the moment when the stapling operation proper begins;

Fig. 2 is a diagrammatic sectional detail, showing the finishing of a stapling operation;

Fig. 3 is a fragmentary elevation, showing said finishing of the stapling operation;

Fig. 4 is a fragmentary detail, showing a stapling blade with an angular stapling wire at the start of the stapling operation;

Fig. 5 is a sectional detail, the section being taken on the line 5—5 of Fig. 1;

Fig. 6 is another sectional view, showing the details of a pivoted drive used in my machine;

Fig. 7 is a semi-diagrammatical sectional detail showing the flattening of the sausage and the piercing thereof by a staple when such piercing securing means are used.

Referring now to the drawing more in detail, the numeral 10 indicates the embodiment here shown for a stapling machine for frankfurther linking, in general.

Said machine may have legs 11 by which it may be supported in a permanent manner, or placed adjacent to the sausage filling or stuffing machine on an appropriate table or platform, when needed. An elongated table 12 is secured on the legs 11, having a member 13 thereon which is depressed in the middle to form a trough 14 in which the filled long original casing, to be subdivided, may rest and slide in an axial direction. Such a sausage is generally indicated at 15, having an outer casing 16 and the usual semi-soft filling 17 of comminuted meat, spices, etc.

At an appropriate place, two upstanding members 18 may be secured at the two sides of the table 12 carrying a pivot pin 19, on which may rock an appropriate stapling head, generally indicated by the numeral 20. The upstanding supports 18, at the two sides of the table 12, and the pivot pin 19 between them, form a bridge over the sausage 15, permitting an easy movement of the same thereunder in its trough 14.

The stapling head 20 may be of any appropriate construction, well-known in the art, and in the embodiment shown in Fig. 1, the main operative features of one of such well-known machines are shown, adapted for the present purpose, the machine in which the constructional details of said head 20 are embodied being known in the trade as the "Hotchkiss," manufactured by the E. H. Hotchkiss Co. at Norwalk, Conn., and patented on December 10, 1918, No. 1,767,285, in which patent said features are described.

Said stapling head consists of a generally vertically placed hollow casting 21, being pivoted on the pin 19 by an elongated substantially horizontal branch 22 thereof. In said branch are slidingly housed the well-known angular wire staples 23 (Figs. 1 and 4), being urged forwardly by a sliding head 24, secured on a spring 25, coiled in a housing 26.

A block 27 is provided in the lower part of the hollow casting 21 and the stapling wire blanks are pressed against the front face 28 of said block.

A slot 29, permitting the downward exit of the first one of said staples 23, is provided in the lower end of the casting 21 and a blade 30 is arranged, movable upwardly and downwardly, over said blank and said slot 29. The blade 30 is carried by an upwardly and downwardly sliding plunger 31 normally pressed in an upward direction by the coil spring 32, arranged between the collars 33 and 34, secured on said plunger and on the inside of said casting 21, respectively. The upper end of plunger 31 is forked, the bottom of the forked slot being indicated at 31b, and a roller 31a is set into the slot, being rotatable on pin 31c.

Flat springs 34a arranged at the two sides of the table 12 and engaging the underside of said horizontal branch 22, are normally urging said branch and the head 21, with their associate parts, in an upward direction.

A counter stapling head 35 is provided, in axially alined relation to the head 21, in the embodiment shown in the drawing, said counter head 35 being slidable in a socket 36 in the forward leg 11 of the device; the upper stapling head or casting 21 and the counter head 35 are interconnected by the link mechanism 37, 38 in such a manner that they simultaneously will move towards each other, or away from one another, as will be understood. Arm or link 38 is rockable on a stationary pin 38a, and the left hand side thereof is provided with a slot 38b in which may slide pin 35a secured on a downward extension 35b of the part 35, and slidable therewith.

The lower or counter stapling head 35 may have a forming groove or recess 39 in its upper surface, axially alined with the slot 29, to form the necessary staple loops 23a from the staples 23 when the same are pressed thereinto, as it is well-known in such machines.

In the embodiment of a stapling machine used in my invention, and indicated in Fig. 1, a shaft 40 may be arranged over the plunger 31, said shaft being constantly rotated from any appropriate source or power (not shown) when the machine is in use.

A suitably shaped cam 41 is secured on the shaft 40 rotating therewith and a crank 42 is also rotatable with it, said cam and said crank being in a predetermined angular relation to one another.

For intermittently propelling the sausage 15, a swinging arm 43 is provided in this embodiment of my device, said arm being rockable on a pivot 44 arranged in an appropriate stationary portion 45 of the machine. An arcuate member 46 surrounds the sausage 15 at the portion thereof where the propelling is to be executed, the lower termination 43a of said arm being connected to an appropriate pin 46a on said arcuate member by a link member 47. A plurality of forwardly projecting spring fingers 48 are secured in the arcuate member 46, having inward bends 49 at their free ends. These resilient bends will engage the sausage 15 in one position of the link 47 and disengage it in another position thereof, as will be more fully explained presently.

The arcuate member 46 is continued in two downwardly turned branches 46b, carrying a pin 50 underneath the table 12 of the machine, and rollers 51 may be arranged on the pin 50 thereby to facilitate the forward and backward movement of the arcuate member 46, as will be described hereinafter.

A pivoted arm or rod 52 is secured to the pin 42a of the crank 42, said rod 52 having a central slot 52a, and a pivoted arm or rod 53 is rockably secured to a pin 54 on the arm 43 through the parts 57 and 53c (Fig. 1), the inner end of said rod 53 carrying a pin 53a slidable in the slot 52a, these parts providing an appropriate driving connection between the shaft 40 and the arm 43, it being understood that rod 53 is behind rod 52 (Fig. 6).

The use and operation of my machine are as follows:

The long sausage 15, coming from the filling or stuffing machine, will be placed into the trough 14 and pulled forwardly until its forward end is engaged by the spring fingers 48, and upon the forward movement of the swinging arm 43, said fingers will move the sausage 15 in the trough 14 forwardly with the distance of the swing of the arm 43, as will be explained presently.

Fig. 1 illustrates my machine in the position right after such a moving of the sausage 15, and when the next stapling operation is just beginning.

The roller 31a on the upper end of the plunger 31 is engaging the narrowest portion of the cam 41, that is, its hub 41a, so that springs 34a are allowed to push the whole stapling head 21 into its uppermost open position, and coiled spring 32 will push the plunger 31 also into its highest position.

When the stapling head 21 is in its described highest position, the counter stapling head 35 will be in its lowest position, as indicated, through the action of the link mechanism 37, 38, as will be obvious, and it will be seen that the sausage 15 is now entirely free between the heads 21 and 35.

Supposing that shaft 40, and the cam 41 and crank 42 thereon, rotate in an anti-clockwise direction, as indicated by the arrow 55, the forward operating edge 41a of the cam 41 will pass over the roller 31a and will gradually push the plunger 31 in a downward direction. In the first part of this downward pressure, the whole stapling head 21 will be moved downward against the springs 34a, until it will closely engage the sausage 15 from above, while at the same time the counter head 35 will move upwardly and engage the sausage 15 from below. During this time, the plunger 31 remains with reference to the casting head 21 in the relative position indicated in Fig. 1, since coiled spring 32 offers considerably larger resistance to pressure than the flat springs 34. The machine, however, may be designed in such a manner that when the heads 21 and 35 arrive into the position shown in Fig. 2, the resistance of the spring 34a will be larger than that of the spring 32, and upon the continued downward pressure of the edge 41a of the cam 41, spring 32 will be compressed and plunger 31 will be moved downwardly relative to head 21, carrying the blade 30 and the foremost staple blank 23 with it, and performing the stapling operation, as will be understood, the result of which will be a staple 23a around the constricted part 15a of the sausage.

The stapling is finished when the outer circumferential edge 41b of the cam 41 begins to ride on the roller 31a, and the two stapling heads will be kept in their meeting positions, tightly catching the sausage 15 between them as long as said outer edge 41b of the cam rides over the plunger 31.

The crank 42 follows the cam 41 and said stapling operation will take up approximately one-quarter of a rotation of the shaft 40, in the embodiment shown, starting somewhat after the lowermost position I of the crank circle 56 and ending at a small angular distance after the left end outermost position IV of the crank circle, and during this time the front rod 52 will idly slide on the pin 53a until, about at the end of the stapling operation, the right end termination 52b of the slot 52a will engage said pin 53a and will begin to pull the rod 53 and the swing arm 43 therewith in a left-hand direction.

The cam will ride on its outer highest surface 41b for about the next quarter turn of the shaft 40, that is, until a short distance after the uppermost position, indicated by III on the crank circle, and during this time the sausage 15 will be tightly secured by the stapling heads 21 and 35, while, at the same time, arm 43 will swing from its foremost position, shown by full lines in Fig. 1, to its rearmost position 43'', indicated by the dotted lines in said Figure 1. The position of pin 46a, the length of the arm 43, and the length of the link member 47 may be arranged in such a manner that, upon the return of the arm 43, said link 47 will be thrown to the left side of the arcuate member 46, as against its forward position, shown in the drawing, and in such a position spring fingers 48 may be lifted somewhat upwardly and they may idly ride in a backward direction over the sausage 15. As will be seen in Fig. 5, arcuate member 46 may be made of two halves having central upstanding extensions 46c set closely together and joined by the pivot pin 46a for the link member 47. Said link member is made of two identical parts between which are arranged said extensions 46c, at the one side, and the lower end of the arm 43, at the other side.

This backward movement of the arm 43 and spring fingers 48 is executed substantially during the second quarter of the rotation of the shaft 40 and will terminate somewhat after position III on the crank circle.

During the third quarter of the rotation of the shaft 40, substantially from position III to II, the downward edge 41c of the cam 41 will gradually release the coiled spring 32 and the flat spring 34 thereafter, whereby, at about the position II on the crank circle, or somewhat later, the stapling heads 21 and 35, as well as the rest of the mechanism, will again take up the open position shown in Fig. 1, and during this third quarter of the revolution, the wide front rod 52 will idly slide in a forward direction by its slot 52a over the pin 53a until its inner left-end termination 52c will engage the pin 53a.

During the rest of the revolution of shaft 40, that is, during the fourth quarter thereof, from somewhat after the position II until after the position I, the stapling heads will remain open, the cam 41 being inoperative during this part of the revolution, while the crank 42 will push the arm 43 forwardly from its dotted position 43'', to its full line position 43, and during this movement, the link 47 will be swung forwardly, as shown in the drawing, and spring fingers 48 will engage the sausage 15, their depressions 49 being pressed into the soft body thereof to a desired degree, so that the forward movement of the arm 43 will cause the sausage 15 to slide in the trough 14 to a distance determined by the swing of said arm 43, and a new stapling operation may start, as described hereinbefore, at such a distance from the one just finished.

If it is desired to change the distance through which the sausage 15 will be moved, that is the length of the individual frankfurter, appropriate regulating means may be provided in my machine to change the swing of the arm 43. Such a means, in the form of turn-buckle 57, is indicated in Fig. 1, its operation being obvious.

Spring means 58 may also be applied, forwardly and rearwardly on the arcuate member 46 by any appropriate means, sliding on the bed 12, to steady the motion of said arcuate member and to prevent undue pressure and impression of the spring arms 48 on the sausage, or a too easy lifting of them from the same.

I may remark that the stapling loop 23a preferably is made somewhat loose and not very tight on the constricted portion 15a of the sausage 15.

It is also obvious that means may be provided whereby the operation of the machine may be stopped, while a new long sausage 15 is being fed thereinto, or at any time when it is desired to prevent the formation of stapling loops, and while such means are well-known to those versed in this art, I may mention that one form thereof may embody an appropriate coupling between the shaft 40 and the electric motor, or other source of power, as well as a brake device for the shaft 40. When it is desired to permit the rotation of the shaft 40 and the operation of my linking device, the operator of the machine may keep his foot on a pedal, which pedal will throw the coupling into operating position, and will remove the brake from the shaft 40, while, upon the removal of the foot from said pedal, said coupling will be automatically disconnected and said brake automatically applied to the shaft 40.

While I have described an operative embodiment of the machine to be used with my process and the preferred steps of my process, it will be understood that changes and variations may be made in the steps of my process and in the details and combinations of the means for the same, and I reserve my rights to all such changes and variations which are within the spirit of this specification and the scope of the claims hereto appended.

Such changes may consist, for instance, in using for stapling a band or other piece of material, instead of the wire shown, also, in general, in using other means for constricting and securing the original elongated sausage, which may be called "the primary sausage," at predetermined places. Instead of forming a ring for stapling, as shown, I may use another well-known form, that is, piercing the material of the casing with the stapling wire. It is also understood that instead of the power operation shown for the devices for moving, stopping, stapling, and again moving, the unlinked primary sausage, all these operations may be done by man power, either by hand, or through the aid of foot pedals, etc.

Fig. 7 illustrates that modified form of securing the constricted portions of the sausage wherein staples adapted to pierce the material of the casing are used, and in said figure, 21 indicates a portion, in section, of the upper constricting and shaping head, 35 a part, in section, of the lower constricting head, 23b the staple adapted to pierce the casing 16 of a sausage at its constricted portion, shown in section, the appropriately shaped recesses 39a in the lower shaping head 35 being adapted to turn the lower points 23c of the staple legs inwardly, so that upon a flattening of the staple, the lower portion of its legs will lay flat underneath the constricted portion of the sausage, whereby the staple 23b will pierce said constricted portion and will also embrace or encircle the central part thereof, as will be understood by those versed in this art.

What I claim is new, is:

1. In a device for sub-dividing a long "primary" sausage into links, means to shape and constrict portions of the sausage at pre-determined distances from one another, and means to apply securing elements to keep said constricted portions in such condition, said shaping and constricting means comprising heads adapted to approach one another for such constricting operation, and separate thereafter, said heads when they are closed upon the sausage co-acting in the application of said securing elements.

2. In a device for subdividing a long filled "primary" sausage into links, means to advance the sausage periodically and means to constrict said sausage and to apply securing elements at spaced points on the sausage, so as to form successive links between the points of constriction, said constricting and linking means comprising coacting upper and lower heads and ejecting means, said heads being actuated so as to approach and leave each other, said upper head being provided with a channel and feeding means to supply securing elements to said channel, said ejecting means being adapted to eject in succession the said securing elements through said channel, and said ejecting means and said heads coacting to constrict the sausage and to apply at each constriction a securing element thereto.

3. In a device for subdividing a long filled "primary" sausage into links, means to advance the sausage and means to constrict said sausage and to apply securing elements at spaced points on the sausage, so as to form successive links between the points of constriction, said constricting and linking means comprising coacting heads and ejecting means, said heads being actuated so as to approach and leave each other, one of said heads being provided with an opening and feeding means to supply securing elements to said opening, said ejecting means being adapted to eject in succession the said securing elements through said opening, said heads coacting to constrict the sausage.

4. In a device for sub-dividing a long "primary" sausage into links, means to advance the sausage through the device, means to shape and constrict a portion of the sausage at selected points, and means to apply securing elements to said constricted portions, said shaping and constricting means being in the form of heads adapted to close on the sausage for such constricting and shaping operation, said means to apply the securing elements being associated with said heads, means in said device to cause said shaping and co-acting heads to close upon said sausage at pre-determined phases of the advance of it, means in said device to activate said means for applying the securing elements on said constricted portion at a pre-determined phase of the action of said heads, and means in said device to cause said heads to separate at a pre-determined phase of said securing operation.

5. In a device as set forth in claim 4, means in the device to stop said advancing means during said constricting and securing operations, and means in the device to again start said advancing means upon the conclusion of such operations.

6. In a device for subdividing a long "primary" sausage into links, means to constrict portions of the sausage at predetermined distances from one another, and securing means applied to said constricted portions in such condition, said constricting means comprising heads adapted to approach one another for such constricting operation, and to separate thereafter, said heads when they are closed upon the sausage applying said securing means.

7. In a device for subdividing a long "primary" sausage into links, heads adapted to approach one another to constrict the sausage at predetermined spaced apart points, and to separate after each constriction, and securing means applied to each constricted portion by said heads while they are closed upon the same.

8. In a device as set forth in claim 7, said sausage having a casing, and said heads closing the walls of said casing substantially upon one another, and said securing means fastening said wall portions upon one another.

JOSEPH HAAG.